United States Patent
Zavarehei et al.

(10) Patent No.: US 8,326,619 B2
(45) Date of Patent: Dec. 4, 2012

(54) ADAPTIVE TUNING OF THE PERCEPTUAL MODEL

(75) Inventors: Esfandiar Zavarehei, Cambridge (GB); David Hargreaves, Cambridge (GB)

(73) Assignee: Cambridge Silicon Radio Limited, Cambridge, Cambridgeshire (GB)

( * ) Notice: Subject to any disclaimer, the term of this patent is extended or adjusted under 35 U.S.C. 154(b) by 214 days.

(21) Appl. No.: 12/679,729

(22) PCT Filed: Sep. 9, 2008

(86) PCT No.: PCT/GB2008/050804
§ 371 (c)(1),
(2), (4) Date: Mar. 24, 2010

(87) PCT Pub. No.: WO2009/056867
PCT Pub. Date: May 7, 2009

(65) Prior Publication Data
US 2010/0204997 A1    Aug. 12, 2010

(30) Foreign Application Priority Data
Oct. 31, 2007  (GB) .................................. 0721376.2

(51) Int. Cl.
G10L 19/02    (2006.01)
G10L 19/00    (2006.01)
(52) U.S. Cl. ..................... 704/229; 704/200.1; 704/201
(58) Field of Classification Search .................. 704/200, 704/200.1, 201, 203, 205, 229, E19.01, E19.011, 704/E19.012, E19.022
See application file for complete search history.

(56) References Cited

U.S. PATENT DOCUMENTS

| | | | | |
|---|---|---|---|---|
| 5,649,053 A * | 7/1997 | Kim | | 704/229 |
| 6,009,399 A | 12/1999 | Spille | | |
| 6,487,535 B1 * | 11/2002 | Smyth et al. | | 704/500 |
| 6,792,402 B1 | 9/2004 | Chen | | |
| 6,999,919 B2 | 2/2006 | Layeghi et al. | | |
| 7,725,313 B2 * | 5/2010 | Konda et al. | | 704/229 |
| 2001/0053973 A1 * | 12/2001 | Tsuzuki | | 704/229 |
| 2002/0004718 A1 * | 1/2002 | Hasegawa et al. | | 704/229 |
| 2004/0098268 A1 * | 5/2004 | Ha | | 704/500 |
| 2004/0181393 A1 | 9/2004 | Baumgarte | | |
| 2006/0069555 A1 | 3/2006 | Konda et al. | | |

FOREIGN PATENT DOCUMENTS

| | | |
|---|---|---|
| DE | 10113322 C2 | 10/2002 |
| EP | 0661821 B1 | 6/1999 |
| EP | 0803989 B1 | 6/1999 |

(Continued)

OTHER PUBLICATIONS

Painter T. et al., Perceptual Coding of Digital Audio, Proceedings of the IEEE, vol. 88, No. 4, Apr. 2009, pp. 451-513.

(Continued)

*Primary Examiner* — Jesse Pullias
(74) *Attorney, Agent, or Firm* — RatnerPrestia

(57) ABSTRACT

Methods of encoding a signal using a perceptual model are described in which a signal to mask ratio parameter within the perceptual model is tuned. The signal to mask ratio parameter is tuned based on a function of the bitrate of the part of the signal which has already been encoded and the target bitrate for the encoding process. The tuned signal to 5 mask ratio parameter is used to compute a masking threshold for the signal which is then used to quantise the signal.

17 Claims, 8 Drawing Sheets

FOREIGN PATENT DOCUMENTS

| | | |
|---|---|---|
| EP | 1076295 A1 | 2/2001 |
| WO | 2007/098258 A1 | 8/2007 |

OTHER PUBLICATIONS

Lewiston C., Fundamentals of Perceptual Audio Encoding, HST.723 Lab II, Feb. 25, 2005.

Schuller G., Perceptual Audio Coding Using Adaptive Pre- and Post-Filters and Lossless Compression, IEEE Transactions on Speech and Audio Processing, vol. 10, No. 6, Sep. 2002, pp. 379-380.

MP3, From Hydrogenaudio Knowledgebase, http://wiki.hydrogenaudio.org/index.php?title=MPEG1_Layer_3, Jun. 14, 2007.

Te-Hsueh Lai et al., A NMR Optimized Bitrate Transcoder for MPEG-2/4 LC-AAC, Circuits and Systems, 2007, IEEE pp. 3936-3939.

Evelyn Kurniawati et al., Low Power Stereo Perceptual Audio Coding Based on Adaptive Masking Threshold Reuse, Audio Engineering Society, Presented at the 122nd Convention May 5-8, 2007, Vienna, Austria, pp. 1-7.

\* cited by examiner

ADAPTIVE TUNING OF THE PERCEPTUAL MODEL

BACKGROUND

There are a number of possible encoding methods which may be used to compress audio files. Constant bitrate (CBR) encoding provides a constant rate output from a codec, i.e. a CBR encoder uses the same frame size for every frame. This may be beneficial when audio files are to be streamed across a medium of fixed bandwidth (e.g. over a wireless channel) because an audio file can be encoded at a bitrate which matches the available bandwidth. However as the nature of an audio stream is typically very non-uniform, such CBR coding techniques use more bits than are required for simple passages whilst being limited in bit allocation for complex passages. Where a particular frame has a complex sound in it, the encoder reduces the quality of the signal until it can be encoded in the available number of bits.

Variable bitrate (VBR) encoding however can respond to the complexity of any particular passage and allocate more bits to complex passages and fewer bits to less complex passages. Problems may occur, however, when streaming VBR encoded files because the resultant bitrate is unpredictable and the receiver may only have a limited buffer.

A compromise between CBR and VBR is average bitrate encoding (ABR). In ABR the encoder has flexibility in allocating bits to frames dependent on the complexity of the signal in any particular frame whilst maintaining a target average bitrate over a defined time period. This results in a higher quality signal than CBR and a more predictable bitrate than VBR. However, as the encoder does not know in advance which portions of the audio are more complex and therefore require more bits, some form of bit rate adjustment is usually required in order to ensure that the target average bitrate is achieved. This bit rate adjustment, which may be referred to as 'post-processing', often requires many iterations around a loop before the target average bitrate is achieved and these iterations may be computationally intensive.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Methods of encoding a signal using a perceptual model are described in which a signal to mask ratio parameter within the perceptual model is tuned. The signal to mask ratio parameter is tuned based on a function of the bitrate of the part of the signal which has already been encoded and the target bitrate for the encoding process. The tuned signal to mask ratio parameter is used to compute a masking threshold for the signal which is then used to quantise the signal.

A first aspect provides a method of encoding a signal comprising: inputting the signal to a perceptual model; generating a masking threshold for the signal based on the signal and a signal to mask ratio parameter; quantising and encoding the signal based on the masking threshold; and tuning the signal to mask ratio parameter based on at least a function of a bitrate of an encoded portion of the signal and a target bitrate.

The method may further comprise: repeating tuning the signal to mask ratio parameter periodically. The signal may be divided into a sequence of frames the signal to mask ratio may be tuned every N frames, where N is an integer.

The signal to mask ratio parameter may be tuned by calculating an average bitrate of the encoded portion; and adjusting the signal to mask ratio parameter based on at least a function of the average bitrate and the target bitrate for the signal.

The adjustment of the signal to mask ratio parameter may be further based on a function of a short-term average bitrate calculated over a part of the encoded portion. The part of the encoded portion may comprise N frames, where N is an integer.

The adjustment of the signal to mask ratio parameter may also be based on a tuning factor. The tuning factor may be updated based on a measured change in bitrate.

The signal to mask ratio parameter may be adjusted using:

$$SMR(\text{adjusted}) = SMR(\text{original}) + \frac{(1+\alpha)B_T - \bar{b}(n) - \alpha b(n)}{\alpha \beta(n)}$$

where $B_T$ is the target bitrate, $\bar{b}(n)$ is the average bitrate, $b(n)$ is a short-term average bitrate calculated over a part of the encoded portion, $\beta(n)$ is a tuning parameter and $\alpha$ is a predefined parameter.

The tuning factor may be updated using:

$$\beta(n+1) = \frac{M\beta(n) + \frac{\Delta b(n)}{\Delta SMR}}{M+1}$$

where $\Delta SMR$ is a previous change in signal to mask ratio parameter, $\Delta b(n)$ is a corresponding resultant change in the short-term average bitrate and M is a smoothing factor The method may further comprise limiting any change in signal to mask ratio parameter and/or limiting any change in tuning factor.

The perceptual model may comprise a psychoacoustic model and the signal may comprise an audio signal.

A second aspect provides a method of encoding substantially as described with reference to any of FIGS. 3 to 8 of the drawings.

A third aspect provides an encoder comprising: a perceptual model arranged to generate a masking threshold for a signal based on the signal and a signal to mask ratio parameter; means for quantising and encoding the signal based on the masking threshold; and means for tuning the signal to mask ratio parameter based on at least a function of a bitrate of an encoded portion of the signal and a target bitrate.

The means for tuning may be arranged to: calculate an average bitrate of the encoded portion; and adjust the signal to mask ratio parameter based on at least a function of the average bitrate and the target bitrate for the signal.

The adjustment of the signal to mask ratio parameter may be further based on a function of a short-term average bitrate calculated over a part of the encoded portion. The part of the encoded portion may comprise N frames, where N is an integer.

The adjustment of the signal to mask ratio parameter may also be based on a tuning factor. The tuning factor may be updated based on a measured change in bitrate.

The means for tuning may be arranged to adjust the signal to mask ratio parameter by computing:

$$SMR(\text{adjusted}) = SMR(\text{original}) + \frac{(1+\alpha)B_T - \overline{b}(n) - \alpha b(n)}{\alpha \beta(n)}$$

where $B_T$ is the target bitrate, $\overline{b}(n)$ is the average bitrate, $b(n)$ is a short-term average bitrate calculated over a part of the encoded portion, $\beta(n)$ is a tuning parameter and $\alpha$ is a predefined parameter.

The means for tuning may be further arranged to: limit any change in signal to mask ratio parameter and/or any change in tuning parameter.

The perceptual model may comprise a psychoacoustic model and the signal may comprise an audio signal.

The methods described herein may be performed by firmware or software in machine readable form on a storage medium. The software can be suitable for execution on a parallel processor or a serial processor such that the method steps may be carried out in any suitable order, or simultaneously.

A fourth aspect provides a computer program arranged to perform any of the methods described herein. The computer program may be stored on a tangible machine readable medium.

This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
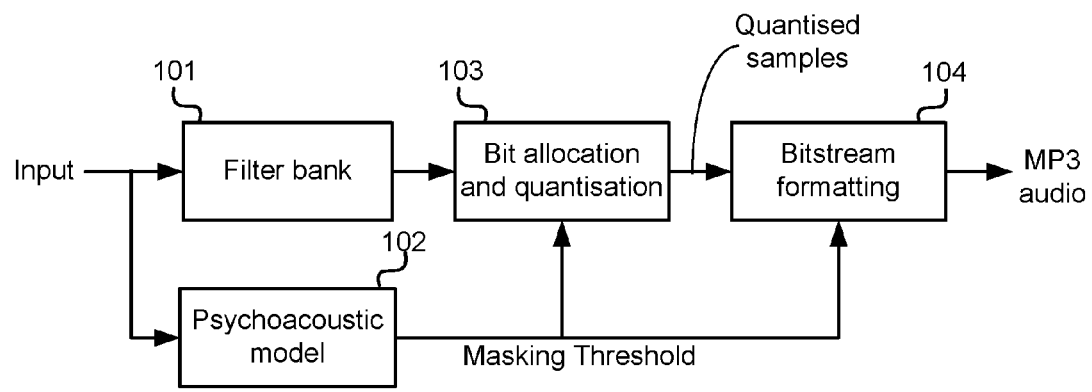
FIG. 1 shows a schematic diagram of a perceptual encoder.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

FIG. 1 shows a schematic diagram of a perceptual encoder, such as an MP3 encoder, which uses a psychoacoustic model to discard parts of the signal which are not perceptible to human hearing. The characteristics of the psychoacoustic model are a result, at least in part, of the anatomy of the human ear. The use of a psychoacoustic model enables the encoder to achieve high levels of compression without impacting the perceived signal quality.

It will be appreciated that FIG. 1 shows the functional elements within an example MP3 encoder and there may be additional or fewer elements. Furthermore the elements may be combined in different ways without losing the overall effect and they may all be implemented, for example, within a single chip.

In a perceptual encoder, such as shown in FIG. 1, the input passes substantially simultaneously through a filter bank 101 and the psychoacoustic model 102. The psychoacoustic model 102 outputs parameters which define a global masking threshold. The global masking threshold specifies the maximum amount of noise (e.g. quantisation noise in coding) in any band which is permissible without introducing audible artefacts. The generation of the masking threshold is described in more detail below. The masking threshold output by the psychoacoustic model is used in bit allocation and quantisation (in element 103) to produce quantised samples. These quantised samples are then input to the bitstream formatting element 104 where they are formatted, for example by being coded using a Huffman code.

In order to achieve a target bitrate (particularly in ABR) post-processing may be required. This post-processing involves iterating the encoding of signal frames (e.g. through adjusting the quantisation step size and/or scaling factors of sub-bands) until the target bitrate is achieved. These iterations are processor intensive. In an example, the post-processing may involve nested loops, e.g. an inner loop which changes the quantisation size until the bit requirements for Huffman coding of a frame are small enough (as defined by the target bit rate), and an outer loop which applies scaling factors if the quantisation noise in a band exceeds the masking threshold. As these two loops are related, (i.e. changes in quantisation size affect the quantisation noise as well as the bitrate), the iteration process is complex.

The masking thresholds are determined within the psychoacoustic model 102 using a signal to mask ratio (SMR) parameter, which determines the ratio of signal energy to the energy of 'just noticeable noise'. The SMR is based on the principle that a sound may be made inaudible due to the presence of another sound and factors which may influence this include the frequencies of the sounds and the volume (or sound pressure level (SPL)) of the sounds. The nature of the sound, i.e. whether it is a tone or noise, can also affect the masking effect of the sound and the determination of the masking thresholds (by the psychoacoustic model) also includes analysis of the audio signal to identify potential noise maskers and tone maskers. SMR, noise maskers and tone maskers are described in more detail below with reference to FIG. 2.

Figure 2:
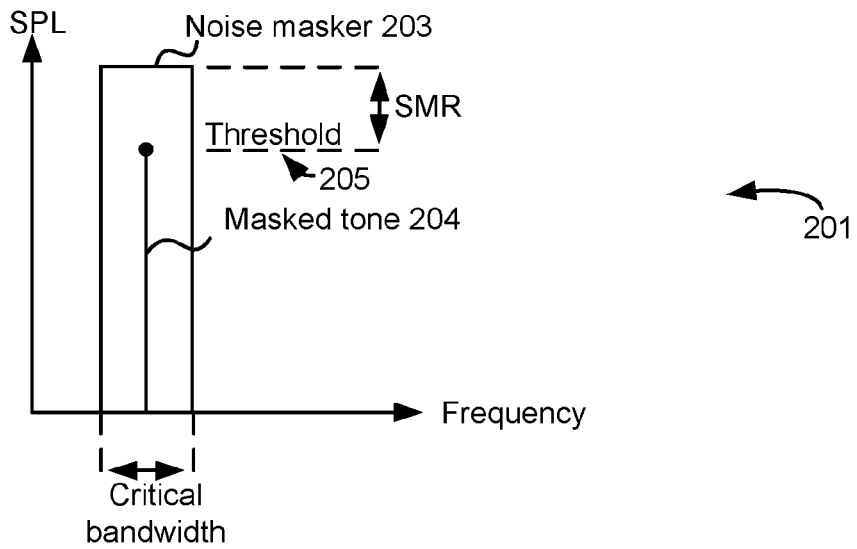
FIG. 2 shows two graphs, one showing noise masking a tone and one showing a tone masking noise.
Figure 2:
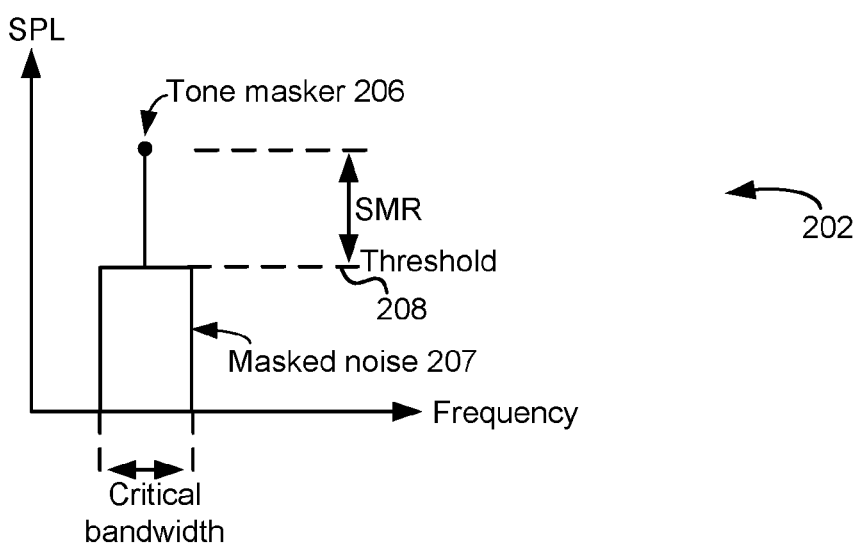

FIG. 2 shows two particular scenarios, where a noise masks a tone (graph 201) and where a tone masks a noise (graph 202). In the first scenario, a narrow band noise 203 masks a tone 204 within the same critical band where the tone is below a threshold 205 which is related to the intensity (SPL) of the noise 203 and this difference between the intensity of the noise 203 and the threshold level is the SMR for the noise masking tone (NMT) scenario. In the second scenario, a tone 206 masks noise 207 of sub-critical bandwidth as long as the intensity of the noise is below a threshold 208 which is related to the intensity of the tone 206. The difference between the intensity of the tone and the threshold level is the SMR for the tone masking noise (TMN) scenario. Typically the SMR (TMN) is significantly larger than the SMT(NMT), and in an example from literature, the SMR(TMN) is approximately 24 dB, whilst the SMR(NMT) is approximately 4 dB. A fixed relationship between the SMR(TMN) and the SMR(NMT) may be defined. Fixed values of the SMR may be estimated empirically during development for each target bitrate (e.g. target average bitrate for ABR encoding). The SMR parameter affects all Bark bands similarly.

Within the psychoacoustic model, after a frame of audio is transformed into a frequency domain representation, it is analysed in the following manner. Every potential tone/noise masker is determined and for each critical band one masker type (either tone or noise) is selected. The masking effect of each masker is then spread over neighbouring frequencies. The functions used for spreading the masking effect depend on the type (noise/tone), energy and central frequency of the masker. A typical spreading function which gives the masking effect of masker at frequency bin j at frequency bin i is:

$$T(i, j) = P(j) - Kz(j) + SF(i, j) - SMR \quad (1)$$

$$SF(i, j) = \begin{cases} 17\Delta_z - 0.4P(j) + 11, & -3 \leq \Delta_z < -1 \\ (0.4P + 6)\Delta_z, & -1 \leq \Delta_z < 0 \\ -17\Delta_z, & 0 \leq \Delta_z < 1 \\ (0.15P - 17)\Delta_z - 0.15P, & 1 \leq \Delta_z < 8 \end{cases} \quad (2)$$

where: $T(i,j)$ is the noise threshold at frequency i due to the masker at frequency j (in dB);
  $P(j)$ is the power of masker at frequency j (in dB);
  $z(j)$ is the Bark equivalent frequency of j;
  K and SMR are constants dependant on masker type; and
  $\Delta_z$ is the frequency difference between i and j (in Bark).

Having obtained spreading functions (in dB) for all of the maskers (e.g. using equation (1)), the spreading functions are overlap-added in the linear domain to obtain the global masking threshold. The effect of the absolute threshold of hearing (ATH) which represents the sensitivity of human ear to sounds in different frequencies is also included in calculation of global masking threshold (e.g. by taking the maximum of the overlap-added spreading functions and the ATH at each point in frequency).

The constants in equations (1) and (2) are obtained through exhaustive psychoacoustic experiments and while the constant values in equation (2) can change the characteristic of the masking spread functions in different ranges, those of equation (1) are more global. Specifically the value of K changes the behaviour of the spreading function across different frequencies and SMR parameter has an even broader effect and determines a fixed offset applied to the whole masking threshold.

The encoder of FIG. 1 is shown as providing the actual global masking threshold for use in quantisation by the bit allocation and quantisation element 103. However, many psychoacoustic models used in perceptual audio encoders instead provide the ratio between the signal energy and the global masking threshold. This value (i.e. the ratio between the signal energy and the global masking threshold), which is obtained for each sub-band, is also known as the signal-to-mask ratio (SMR); however this value is not to be confused with the SMR parameter, as defined in equation (1). For the purposes of the description herein, all references to SMR refer to the SMR parameter, as defined in equation (1). The SMR parameter may also be interpreted as the desired perceptual signal-to-noise ratio (SNR).

Typically, audio encoders use a value of SMR parameter in the psychoacoustic model which is based on a lookup table, which may have different SMR values for different target bitrates. These lookup tables may be based on values reported in literature. However, use of such a value of SMR to determine the quantisation levels results in a very variable bitrate. As described above, post-processing is then required to ensure that an average bitrate target is met over a predefined number of frames (which may be the whole file). Some encoders use a bitrate pool to limit the variability in bitrate between frames. In such an encoder, each frame is allowed to use a certain percentage of the bitrate pool and post-processing is still required to meet the target bitrate.

Figure 3:
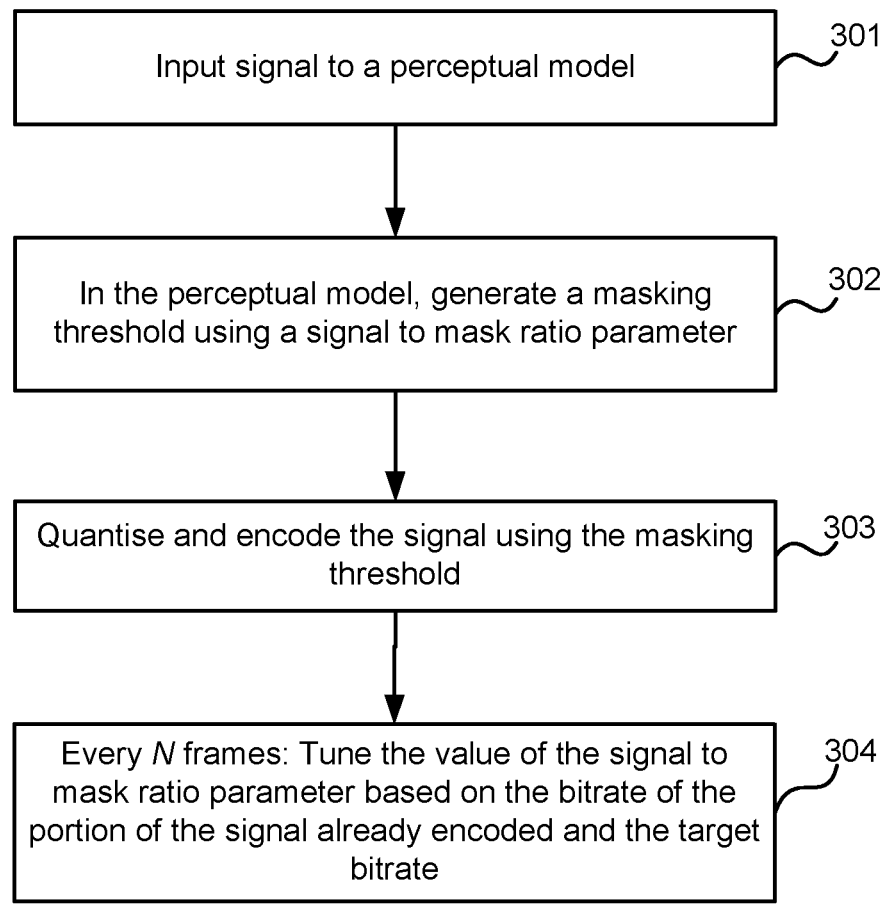
FIG. 3 shows a flow diagram of an example method of encoding a signal.

FIG. 3 shows a flow diagram of an example method of encoding a signal in which the signal is input to a perceptual model (block 301). The term 'perceptual model' is used herein to refer to any model which uses information relating to human perception, be that aural perception (where the perceptual model may be a psychoacoustic model), visual perception or any other type of sensory perception. The perceptual model uses the SMR to generate a masking threshold (block 302) which may be subsequently used in quantising and encoding the signal (block 303). The SMR parameter within the perceptual model is tuned based on the bitrate of the part of the signal which has already been encoded and the target bitrate (block 304) and this parameter is tuned every N frames (where N≧1). By tuning the model in this way, the initial encoded signal (before any iterations) is more likely to result in the target (average) bitrate and therefore the amount of post-processing required is reduced.

Whilst the method of FIG. 3 shows the quantisation and encoding (in block 303) occurring prior to the tuning of the SMR parameter (in block 304), this is by way of example only. The method blocks may be performed in a different order (e.g. block 304 followed by block 303) or substantially simultaneously.

The methods described below use audio signals and a psychoacoustic model by way of example only. The methods described herein are applicable to any signals and any perceptual model.

Figure 4:
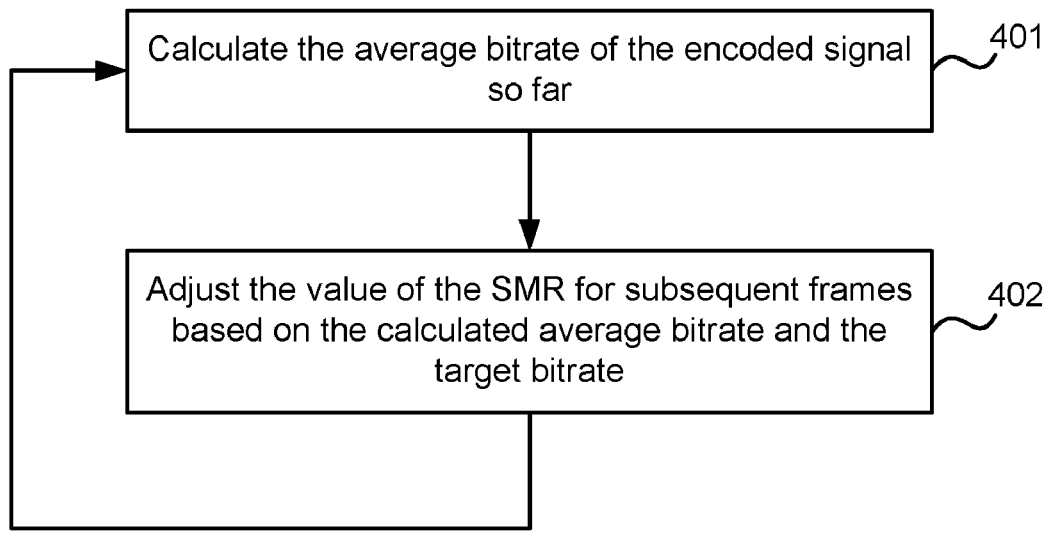
FIG. 4 shows a flow diagram of an example method of tuning the psychoacoustic model.
Figure 5:
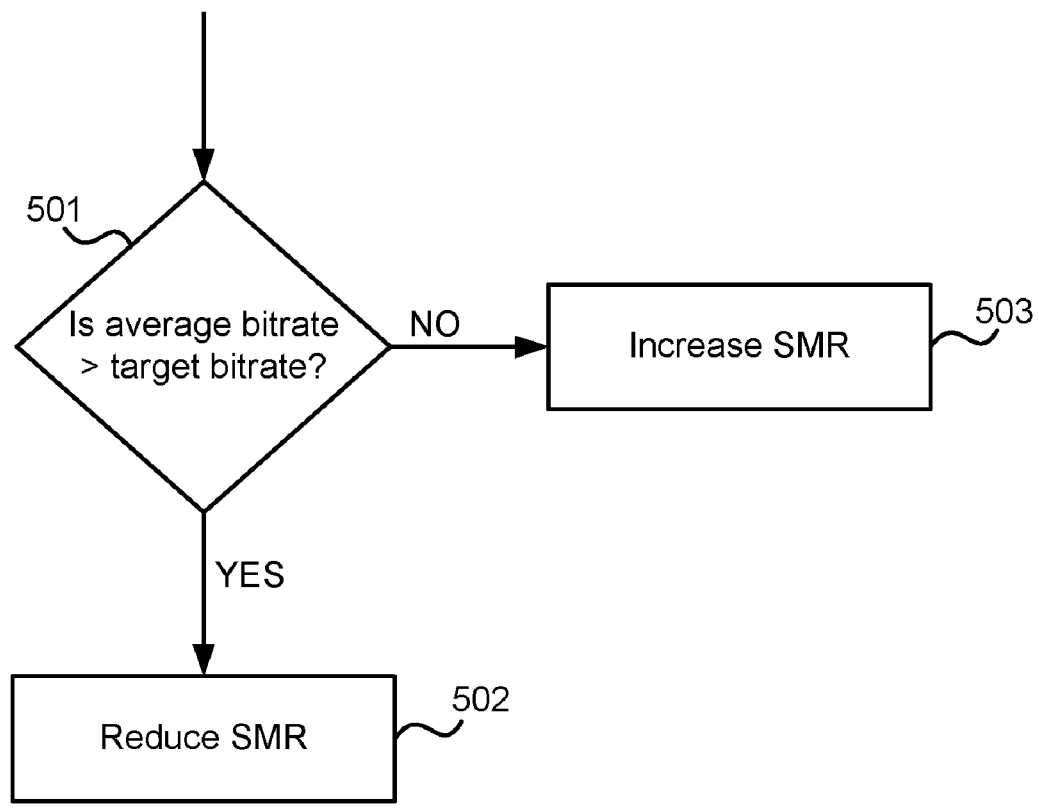
FIG. 5 shows a flow diagram of a method step from FIG. 4 in more detail.

FIG. 4 shows a flow diagram of an example method of tuning the psychoacoustic model. According to the method of FIG. 4, the average bitrate of an encoded signal until time $t_n$ is calculated (block 401) and the value of SMR parameter is then tuned for subsequent frames based on the calculated short-term and/or long-term average bitrates and the target bitrate (block 402). The tuning of the SMR parameter may be based on a comparison of the average and target values (as shown in FIG. 5) or a different algorithm may be used (e.g. as described below). The process may be repeated for each frame or for each N frames. In an example, the process may be repeated every ten frames (N=10). Use of a larger value of N results in a more stable algorithm but reduces the responsiveness of the tuning method. Use of a smaller value of N increases the responsiveness but may result in instabilities if the SMR parameter is tuned due to local maxima/minima rather than a more smoothed version of the signal.

The SMR parameter may be tuned based on the short-term and/or long-term bitrates and the target bitrate, including being tuned based on any function of one or more of the bitrates, e.g. functions of the square of one or more of the bitrates, logarithms of one or more of the bitrates etc, and/or based on functions of other parameters such as the number of samples encoded (which increases with increasing number of iterations). A function of a bitrate may, in an example, be the bitrate itself.

An example implementation of the second step (block 402) of the method of FIG. 4 is shown in more detail in FIG. 5, where if the average bitrate exceeds the target bitrate ('Yes' in block 501), the SMR parameter is reduced (block 502) and if the average bitrate is less than the target bitrate ('No' in block 501), the SMR parameter is increased (block 503). In this example, the SMR parameter may be either the SMR(TMN) or the SMR(NMT) and the other parameter may be calculated according to a fixed relationship between the two.

In an implementation of the method of FIG. 4, the average bitrate from the beginning of the signal until time sample n (at time $t_n$) may be calculated (in block 401) as:

$$\bar{b}(n) = \frac{1}{n} \sum_{i=1}^{n} b(i) \qquad (3)$$

where b(i) is the bitrate of frame i. If the average bitrate after another αn frames is to be equal to the target bitrate, $B_T$, the average bitrate for the next an frames, $b_A$, should be equal to:

$$b_A = \frac{(1+\alpha)B_T - \bar{b}(n)}{\alpha} \qquad (4)$$

The instantaneous bitrate, b(n), therefore should change by:

$$b(n+1) = b(n) + \Delta b(n) = \frac{(1+\alpha)B_T - \bar{b}(n)}{\alpha} \qquad (5)$$

$$\Delta b(n) = \frac{(1+\alpha)B_T - \bar{b}(n) - \alpha b(n)}{\alpha}$$

And the change in SMR should be:

$$\Delta SMR = \frac{(1+\alpha)B_T - \bar{b}(n) - \alpha b(n)}{\alpha \beta(n)} \qquad (6)$$

where β(n) is a measure of amount of change in bitrate which results from a 1 dB change in SMR and is measured in kB·s⁻¹·dB⁻¹. As a result the new SMR for frame n+1 is given by:

$$SMR(n+1) = SMR(n) + \Delta SMR \qquad (7)$$

$$= SMR(n) + \frac{(1+\alpha)B_T - \bar{b}(n) - \alpha b(n)}{\alpha \beta(n)}$$

The value of β(n) may be a predefined parameter and may be a fixed value or a value which is dependent on n. In some example, the value of β(n) may be dependent upon the music type and/or the target bitrate. In an example, β(n) may be 10 kbps/dB at 160 kbps. The value of β(n) may also be tuned, as described below.

Although in the above description and equations (5)-(7), b(n) is described as the instantaneous bitrate, as also described above, the process may be repeated every frame or every N frames. Where the process is repeated every N frames, b(n) may be a short-term average bitrate, averaged over the N frames (e.g. a short-term average bitrate, averaged over 10 frames where N=10). In the limit where N=1, the short-term average bitrate is the same as an instantaneous bitrate. The value of $\bar{b}(n)$ may correspondingly be described as a long-term average bitrate, e.g. the average bitrate from the beginning of the signal until time sample n (at time $t_n$).

In the above description, the averages are described as normal average values. However, in other embodiments, different forms of average values may be used. For example, $\bar{b}(n)$ may be a lossy (or smoothed) average, i.e. an average over a large number of frames which is smoothed over time.

In an embodiment, the value of α may be equal to two. This parameter sets the period over which the tuning of the SMR aims to correct the mismatch of the average bitrate calculated so far for the signal and the target bitrate. The value of this parameter may be selected so that the performance of the ABR encoding with adaptive tuning performs better than using an internal bit reservoir. The value may be fixed or variable and may be selected based on the file size and/or based on the current position in the file (i.e. based on the value of n). In an example of a variable a, the value may be given by:

$$\alpha = \max(1000-n, 2)$$

Such a variable value of α would prevent large changes in SMR at the start of the encoding process and would decrease with time until it reaches a minimum value (in this case equal to two).

By adjusting the value of the SMR, the value can be tuned to the statistics of the actual signal, rather than using fixed values from literature. As the tuning results in the resultant bitrate being closer to the target bitrate, the amount of post-processing (i.e. number of iterations) required is reduced and the quality vs. bitrate compromise is made using a long term soft decision. Furthermore, as the number of iterations is reduced, the number also becomes more predictable and this provides a reasonably predictable processing time for the encoding of a signal.

Figure 6:
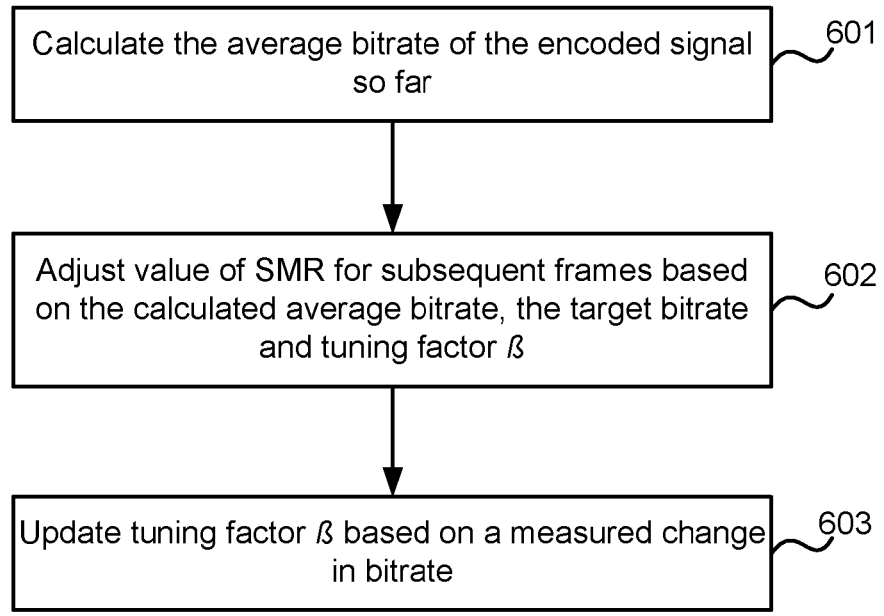
FIG. 6 shows a flow diagram of another example method of tuning the psychoacoustic model.

In a further variation of the method, the value of β(n) may be tuned based on a measured change in bitrate as a result of a change in SMR. This enables the parameter β(n) to be made more accurate and to be adapted to the statistics of the actual signal. Such a method is shown in FIG. 6. As in the method of FIG. 4, the average bitrate of the encoded signal so far is calculated (block 601) and the value of the SMR for subsequent frames is adjusted based on a comparison of the calculated average bitrate, a target bitrate and a tuning parameter, β(n) (block 602). The value of the tuning parameter, β(n), is then updated based on a measured change in bitrate (block 603).

In an example implementation:

$$\beta(n+1) = \frac{M\beta(n) + \frac{\Delta b(n)}{\Delta SMR}}{M+1} \qquad (8)$$

where the bitrate change, Δb(n), is a measured value and is the change in the short-term average bitrate since the last change in SMR, ΔSMR is known (e.g. from equation (6) above) and M is a smoothing factor (and in an example, M=10).

In a further variation of the methods described above, the change in SMR may be controlled dependent on the position of the frame n in the signal. This may result in the controlled change in SMR (ΔSMR) being given by:

$$\Delta SMR' = f(n) \cdot \Delta SMR \qquad (9)$$

where ΔSMR is determined by equation (6) above and f(n) is a function which is dependent on the position of the frame. The value of this function may be chosen so that for a first set of frames in the signal, there is no change in the value of SMR, e.g.:

For n=1 to 50: f(n)=0
For n>50: f(n)=1

Figure 7:
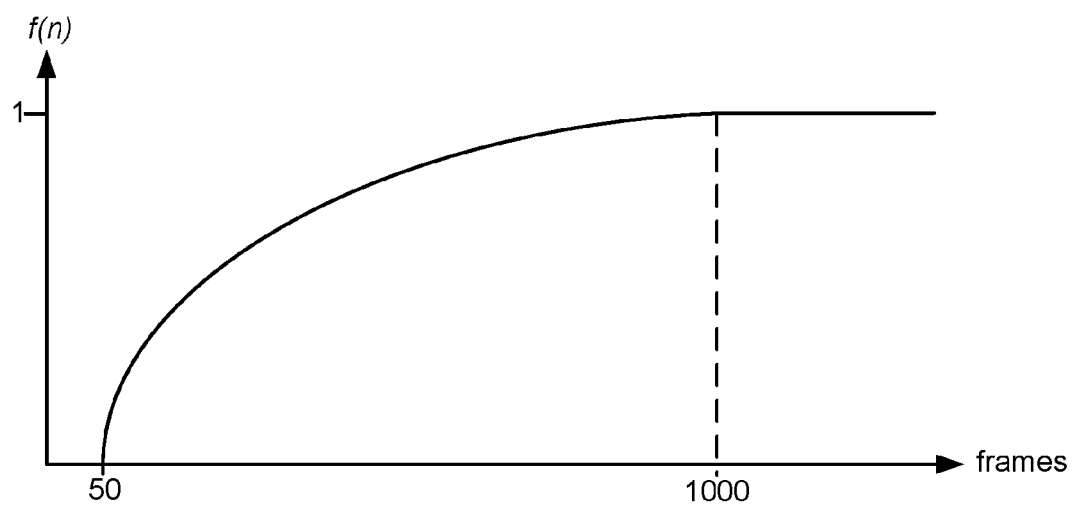
FIG. 7 shows a graph of an example function for controlling the change in signal to mask ratio.

In another example, the value of f(n) may change gradually and an example curve is shown in FIG. 7, which has a threshold at n=50 and then increases until f(1000)=1. Dependent upon the choice of function f(n), this may have a similar effect as using a variable value of α (as described above) although these techniques may be used in combination.

In addition to, or instead of, controlling the change in SMR as described above (i.e. using function, f(n)), the maximum change in SMR may be limited, i.e. the value of ΔSMR (or ΔSMR' where appropriate) may have a maximum permissible value. By limiting the step change in SMR, any over-compensation which might occur when going from passages of silence to speech/music is reduced.

In a similar manner, where the tuning parameter β(n), is also tuned (e.g. as shown in FIG. 6), the maximum change in the tuning parameter (Δβ(n)) may be limited and/or the change in tuning parameters may be controlled dependent on predetermined factors, such as n.

Experimental results obtained using the method of FIG. 6 are shown in the table below. These were obtained from 16,420 MP3 frames (which is 429 seconds of audio) over 40 audio files.

|  | Without adaptive tuning | With adaptive tuning |
|---|---|---|
| Target bitrate | 160 | 160 |
| Average bitrate | 163.1 | 158.6 |
| Bitrate variance (frame by frame) | 1367.5 | 1266.6 |
| Bitrate standard deviation (file by file) | 58.88 | 1.90 |
| Average number of iterations | 20.62 | 18.75 |

The 'average number of iterations' in the table above is the average number of iterations to sub-bands (e.g. by changing the quantisation step size or scaling factor) which are required in order to achieve the target bitrate. If a single sub-band is iterated more than once, each iteration is included within this figure.

In these results, the frame by frame bitrate variance is similar but the file by file variance is reduced substantially by the use of adaptive tuning methods as described herein. This has the result that the overall bitrate of each file is much closer to the mean value when adaptive tuning is applied, compared to without using adaptive tuning. This may be particularly important when the audio signal is encoded for transmission over a medium of limited bandwidth or power or to a receiver with a limited buffer, because the system may not be able to receive signals with an average bitrate which varies by a large amount. The number of iterations has also been reduced by around 10%, which is significant because the bitrate adjustment is one of the most computationally intensive parts of an encoder.

The methods described above relate to a single value of SMR parameter and this parameter may be either the SMR (TMN) or the SMR(NMT). Where one SMR parameter (e.g. SMR(TMN)) is adaptively tuned using one of the methods described above, the value of other the SMR parameter (SMR (NMT) in this example) may be adjusted in a corresponding manner to maintain an approximate relationship between the two SMR parameters (e.g. a constant difference between the two).

In another example, however, the two SMR parameters (SMR(TMN) and SMR(NMT)) may be tuned independently, as shown in the example method of FIG. 8 and described below. In this method, the average bitrate so far, $\bar{b}(n)$, is calculated (block 801) and the current frame, n, is analysed to determine if the maskers within the frame are predominantly noise maskers or predominantly tone maskers (block 802). If the maskers are predominantly tone maskers ('Yes' in block 802), the value of SMR(TMN) may be adjusted (block 803), e.g. using equation (6) or (9) above, and if the maskers are predominantly noise maskers ('No' in block 802), the value of SMR(NMT) may be adjusted (block 804), e.g. using equation (6) or (9) above.

Figure 8:
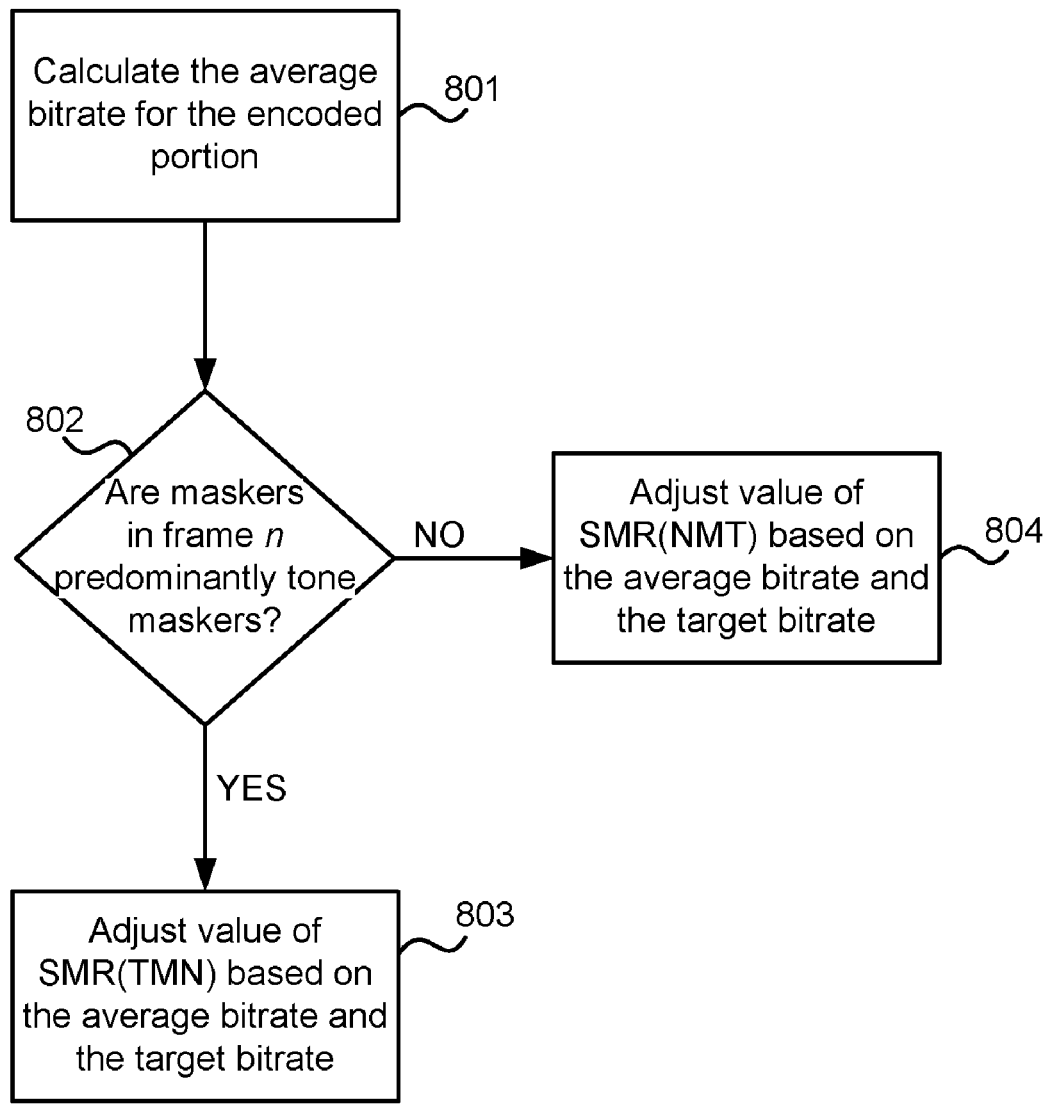
FIG. 8 shows a flow diagram of a further example method of tuning the psychoacoustic model.

In a variation of the method shown in FIG. 8, rather than a hard decision between tone maskers and noise maskers (in block 802), a soft decision may be used such that the decision determines the proportion, γ, of the maskers which are tone maskers and then this proportion is used to determine the resultant change in SMR, for example:

$$\Delta SMR(TMN)' = \gamma \cdot \Delta SMR(TMN) \qquad (10)$$

$$\Delta SMR(NMT)' = (1-\gamma) \cdot \Delta SMR(NMT) \qquad (11)$$

where the values of ΔSMR(TMN) and ΔSMR(NMT) may be calculated, for example, using equation (6) or (9).

The proportion, γ, may be calculated in many different ways and may be based on data for a single frame or for multiple frames (e.g. N frames). In an example:

$$\gamma = \frac{n_{TM}}{n_{TM} + n_{NM}}$$

where $n_{TM}$ is the number of tone maskers during the past N frames and $n_{NM}$ is the number of noise maskers in the past N frames. In another variation the determination of the numbers of maskers may be performed over N' frames, where N'≠N.

Whilst the above description refers to the tuning of the SMR parameter within the psychoacoustic model, in a further embodiment a different parameter within the model may be tuned in a similar manner. For example, the parameter K (from equation (1)) may be tuned instead of, or in addition to, the SMR parameter.

Where the psychoacoustic model (or equivalent for non-audio applications) uses a different spreading function from that shown in equation (1) above, parameters within that spreading function may be tuned in a corresponding manner to that described above.

Whilst the above description refers to the methods being useful in ABR encoding, the methods are also applicable for other coding techniques such as CBR encoding. In such an embodiment, the frame may be initially encoded using the parameters output by the psychoacoustic model and the post-processing may be used to ensure that the particular bitrate of the frame is the same as the target bitrate. Use of the methods described herein which tune parameters within the psychoacoustic model, reduce the amount of post-processing required to meet the target bitrate. In an example implementation, the same equations may be used (as described above) but the short-term and long-term bitrates may be obtained from the bitrate resulting from the first iteration of the quantisation, i.e. the bitrate is the bitrate suggested by the psychoacoustic model. Use of such techniques for coding techniques other than ABR (such as CBR), reduces the number of iterations required and also reduces the computational requirements.

The methods are described above in relation to encoding audio signals, however this is by way of example only and the methods are also applicable to encoding other signals which use a perceptual model. Any reference to audio signals or psychoacoustic models may alternatively relate to any signal and any perceptual model. For video signals, the psychoacoustic model may be replaced by a perceptual model which is based on the physiology of the human eye and human visual acuity, rather than the physiology of the human ear and human aural perceptive abilities. As described above, the SMR parameter may also be interpreted as the desired perceptual SNR.

Any range or device value given herein may be extended or altered without losing the effect sought, as will be apparent to the skilled person.

It will be understood that the benefits and advantages described above may relate to one embodiment or may relate to several embodiments. It will further be understood that reference to an item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art.

The invention claimed is:

1. A method of encoding a signal comprising:
   inputting the signal to a perceptual model;
   generating a masking threshold for the signal based on the signal and a signal to mask ratio parameter;
   quantizing and encoding the signal based on the masking threshold; and
   tuning the signal to mask ratio parameter, wherein tuning the signal to mask ratio parameter comprises:
      calculating an average bitrate of the encoded portion; and
      adjusting the signal to mask ratio parameters, wherein adjusting the signal to mask ratio parameter comprises:

$$SMR(\text{adjusted}) = SMR(\text{original}) + \frac{(1+\alpha)B_T - \overline{b}(n) - \alpha b(n)}{\alpha \beta(n)}$$

where $B_T$ is the target bitrate, $\overline{b}(n)$ is the average bitrate, $b(n)$ is a short-term average bitrate calculated over a part of the encoded portion, $\beta(n)$ is a tuning parameter and $\alpha$ is a predefined parameter.

2. The method according to claim 1, further comprising:
   repeating tuning the signal to mask ratio parameter periodically.

3. The method according to claim 2, wherein the signal is divided into a sequence of frames and repeating tuning the signal to mask ratio parameter periodically comprises:
   repeating tuning the signal to mask ratio parameter every N frames, where N is an integer.

4. The method according to claim 1, wherein the adjustment of the signal to mask ratio parameter is further based on a function of a short-term average bitrate calculated over a part of the encoded portion.

5. The method according to claim 4, wherein the part of the encoded portion comprises N frames, where N is an integer.

6. The method according to claim 1, wherein the adjustment of the signal to mask ratio parameter is further based on a tuning factor.

7. The method according to claim 6, further comprising:
   updating the tuning factor based on a measured change in bitrate.

8. The method according to claim 7, wherein the tuning factor is updated using:

$$\beta(n+1) = \frac{M\beta(n) + \frac{\Delta b(n)}{\Delta SMR}}{M+1}$$

where $\Delta SMR$ is a previous change in signal to mask ratio parameter, $\Delta b(n)$ is a corresponding resultant change in the short-term average bitrate and M is a smoothing factor.

9. The method according to claim 1, wherein tuning the signal to mask ratio parameter based on at least a function of a bitrate of an encoded portion of the signal and a target bitrate further comprises:
   limiting any change in signal to mask ratio parameter.

10. The method according to claim 1, wherein the perceptual model comprises a psychoacoustic model and the signal comprises an audio signal.

11. An encoder comprising:
   a perceptual model arranged to generate a masking threshold far a signal based on the signal and a signal to mask ratio parameter;
   a bit allocation and quantization element arranged to quantize the signal based on the masking threshold;
   a bitstream formatting element arranged to encode the signal based on the masking threshold; and
   a tuning element arranged to:
      calculate an average bitrate of the encoded portion: and
      adjust the signal to mask ratio parameter by computing:

$$SMR(\text{adjusted}) = SMR(\text{original}) + \frac{(1+\alpha)B_T - \overline{b}(n) - \alpha b(n)}{\alpha \beta(n)}$$

where $B_t$ is the target bitrate, $\overline{b}(n)$ is the average bitrate, $b(n)$ is a short-term average bitrate calculated over a part of the encoded portion, $\beta(n)$ is a tuning parameter and $\alpha$ is a predefined parameter.

12. The encoder according to claim 11, wherein the adjustment of the signal to mask ratio parameter is further based on a function of a short-term average bitrate calculated over a part of the encoded portion.

13. The encoder according to claim 11, wherein the adjustment of the signal. to mask ratio parameter is further based on a tuning factor.

14. The encoder according to claim 11, wherein the tuning element is further arranged to:
   limit any change in signal to mask ratio parameter.

15. The encoder according to claim 11, wherein the perceptual model comprises a psychoacoustic model and the signal comprises an audio signal.

16. A method of encoding a signal comprising:
inputting the signal to a perceptual model;
generating a masking threshold for the signal based on the signal and a signal to mask ratio parameter;
quantizing and encoding the signal based on the masking threshold; and
tuning the signal to mask ratio parameter, wherein tuning the signal to mask ratio parameter comprises:
  calculating an average bitrate of the encoded portion;
  adjusting the signal to mask ratio parameter based on at least a function of an average bitrate and a target bitrate for the signal and a tuning factor; and
  updating the tuning factor using:

$$\beta(n+1) = \frac{M\beta(n) + \frac{\Delta b(n)}{\Delta SMR}}{M+1}$$

where $\Delta SMR$ is a previous change in signal to mask ratio parameter, $\Delta b(n)$ is a corresponding resultant change in a short-term average bitrate and M is a smoothing factor.

17. An encoder comprising:
a perceptual model arranged to generate a masking threshold for a signal based on the signal and a signal to mask ratio parameter;
a bit allocation and quantization element arranged to quantize the signal based on the masking threshold;
a bitstream formatting element arranged to encode the signal based on the masking threshold; and
a tuning element arranged to calculate an average bitrate of the encoded portion, adjust the signal to mask ratio parameter based on at least a function of the average bitrate and the target bitrate for the signal and a tuning factor, and update the tuning factor using:

$$\beta(n+1) = \frac{M\beta(n) + \frac{\Delta b(n)}{\Delta SMR}}{M+1}$$

where $\Delta SMR$ is a previous change in signal to mask ratio parameter, $\Delta b(n)$ is a corresponding resultant change in a short-term average bitrate and M is a smoothing factor.

* * * * *

UNITED STATES PATENT AND TRADEMARK OFFICE
CERTIFICATE OF CORRECTION

PATENT NO. : 8,326,619 B2
APPLICATION NO. : 12/679729
DATED : December 4, 2012
INVENTOR(S) : Zavarehei et al.

It is certified that error appears in the above-identified patent and that said Letters Patent is hereby corrected as shown below:

In Column 3, Line 6, after "target bitrate,", delete "b (n)" and insert -- $\overline{b}(n)$ --, therefor.

In Column 7, Line 9, delete "('No'" and insert -- ('No' --, therefor.

In Column 7, Line 26, delete "an" and insert -- αn --, therefor.

In Column 9, Line 2, delete "(ΔSMR)" and insert -- (ΔSMR') --, therefor.

In Column 10, Line 18, delete "('No'" and insert -- ('No' --, therefor.

In Column 11, Line 24, delete "an" and insert -- 'an' --, therefor.

In Column 11, Line 47, in Claim 1, delete "parameters," and insert -- parameter, --, therefor.

In Column 12, Line 36, in Claim 11, delete "far" and insert -- for --, therefor.

In Column 12, Line 43, in Claim 11, delete "portion:" and insert -- portion; --, therefor.

In Column 12, Line 51, in Claim 11, delete "$B_t$" and insert -- $B_T$ --, therefor.

In Column 12, Line 60, in Claim 13, delete "signal." and insert -- signal --, therefor.

Signed and Sealed this
Fifth Day of February, 2013

Teresa Stanek Rea
*Acting Director of the United States Patent and Trademark Office*